United States Patent [19]

Hennessee et al.

[11] Patent Number: 5,467,605
[45] Date of Patent: Nov. 21, 1995

[54] SYSTEM FOR PREVENTING FOGGING IN CLIMATE CONTROL SYSTEM

[75] Inventors: Robert P. Hennessee, Rochester Hills; Gary B. Flaishans, Clarkston; Robert G. Rudzewicz, Sterling Heights; David A. Barwin, Troy, all of Mich.

[73] Assignee: Chrysler Corporation, Highland Park, Mich.

[21] Appl. No.: 432,456

[22] Filed: Apr. 26, 1995

Related U.S. Application Data

[63] Continuation of Ser. No. 159,139, Nov. 22, 1993, abandoned.

[51] Int. Cl.$^6$ .................................................. F25D 21/04
[52] U.S. Cl. .............................. 62/133; 62/157; 62/227
[58] Field of Search .......................... 62/133, 157, 158, 62/231, 227, 176.1, 176.3, 176.6; 165/12; 236/46 R, 46 F, 47

[56] References Cited

U.S. PATENT DOCUMENTS

| 4,790,144 | 12/1988 | Yokouchi et al. | 62/156 |
| 4,821,527 | 4/1989 | Suzuki et al. | 62/209 |
| 4,852,363 | 8/1989 | Kampf et al. | 62/176.6 |
| 4,878,358 | 11/1989 | Fujii | 62/227 |
| 4,909,043 | 3/1990 | Masauji et al. | 62/158 |
| 4,920,755 | 5/1990 | Tadahiro | 62/176.6 |
| 4,970,969 | 11/1990 | Koptis et al. | 110/190 |
| 5,105,366 | 4/1992 | Beckey | 364/505 |
| 5,117,646 | 6/1992 | Nose et al. | 62/227 X |

FOREIGN PATENT DOCUMENTS

| 3836049 | 3/1990 | Germany . |
| 4212680 | 10/1992 | Germany . |
| 62-268725 | 11/1987 | Japan . |
| 03070623 | 3/1991 | Japan . |

Primary Examiner—Harry B. Tanner
Attorney, Agent, or Firm—Christopher A. Taravella

[57] ABSTRACT

A system for preventing fogging in air conditioning systems is disclosed. The system employs a strategy whereby if fogging conditions are present, the temperature of the evaporator is stepped downwardly in increments which allow the surface of the evaporator to stabilize thereby eliminating localized cold spots.

8 Claims, 4 Drawing Sheets

SYSTEM FOR PREVENTING FOGGING IN CLIMATE CONTROL SYSTEM

This is a continuation of application Ser. No. 08/156,139 filed on Nov. 22, 1993, abandoned.

TECHNICAL FIELD

The present invention generally relates to climate control systems, and more particularly relates to a system for preventing the occurrence of fogging in an air conditioning system.

BACKGROUND OF THE INVENTION

Air conditioning systems of the type typically employed in vehicles, utilize a heat exchanger (sometimes referred to an evaporator) to cool the air within the passenger compartment of the vehicle. The evaporator includes one or more internal passages for allowing the flow of refrigeration fluid therethrough. Air is passed over an outside surface of the evaporator and the heat from the air is transferred to the refrigeration fluid as it passes through and evaporates within the evaporator. The refrigerant is forced through the evaporator by a refrigerant pump, commonly referred to as a compressor. The compressor is typically coupled to the engine by way of a belt drive and an electric clutch. The electric clutch engages the compressor to the engine when an electric current is applied to the clutch and disengages the compressor from the engine when the electric current ceases to flow through the clutch. Thus, the electric clutch forms a convenient means of engaging and disengaging the compressor.

A temperature sensing device is typically located on the surface of the evaporator to sense the temperature of the evaporator. This temperature information is used to control the compressor clutch so that the temperature of the evaporator can be controlled.

Various control schemes are known for controlling the temperature of the evaporator. One control scheme for controlling the temperature of the evaporator involves cycling the compressor clutch on and off as the sole means of controlling evaporator temperature. Systems that employ this type of control scheme have a problem known as fogging. Fogging involves the expelling of visible water vapor from the ventilation system of the vehicle. Fogging occurs when the dew point temperature of the air passing through the evaporator is reached. This can occur at localized portions of the evaporator if these localized locations are sufficiently cold, or it can occur if the evaporator, as a whole is too cold.

In the case where localized cold spots are responsible for causing fogging, this typically occurs when the compressor is first turned on after a relatively long period of not operating. Under these conditions, refrigerant flows through the evaporator, rapidly cooling its various surfaces and causing its surfaces to cool at differing rates. As has been already explained, this promotes fogging. The present invention minimizes, or eliminates, fogging by controlling the rate at which initial cooling of the evaporator takes place. This allows the different evaporator surfaces to cool at substantially the same rate and therefore no visible water vapor is expelled.

Thus, it is an object of this invention to set forth a system which controls fogging in an air conditioning system.

It is a further object of this invention to disclose an anti-fogging methodology in which the rate of initial cooling of the evaporator is not compromised.

SUMMARY OF THE INVENTION

In light of the foregoing objects, the present invention provides a method of controlling fogging in an air conditioning system of the type employing an evaporator and a pump driven by a prime mover, the pump circulating refrigerant through the evaporator, including the steps of determining if conditions exist for fogging, and lowering at a controlled rate the temperature of the evaporator.

Preferably, the method includes determining if the prime mover has begun rotating after a period of nonuse and determining if the pump has recently circulated refrigerant through the evaporator.

In a preferred embodiment, lowering the temperature of the evaporator at a controlled rate includes firstly, lowering the temperature of the evaporator by a first incremental amount, then secondly, lowering the temperature of the evaporator by a second incremental amount wherein the first incremental amount is greater than the second incremental amount.

Furthermore, the system of the present invention preferably includes lowering, at a controlled rate, the temperature of the evaporator including the steps of firstly, lowering the temperature of the evaporator from a first temperature to a second temperature, then allowing the temperature of the evaporator to rise to a third temperature wherein the third temperature is bounded by the first and the second temperatures, then lowering the temperature of the evaporator from the third temperature to a fourth temperature wherein the fourth temperature is lower than the second temperature.

Other advantages and meritorious features of the present invention will become more fully understood from the following description of the preferred embodiments, the appended claims, and the drawings, a brief description of which follows.

DETAILED DESCRIPTION OF THE PREFERRED EMBODIMENTS

Figure 1:
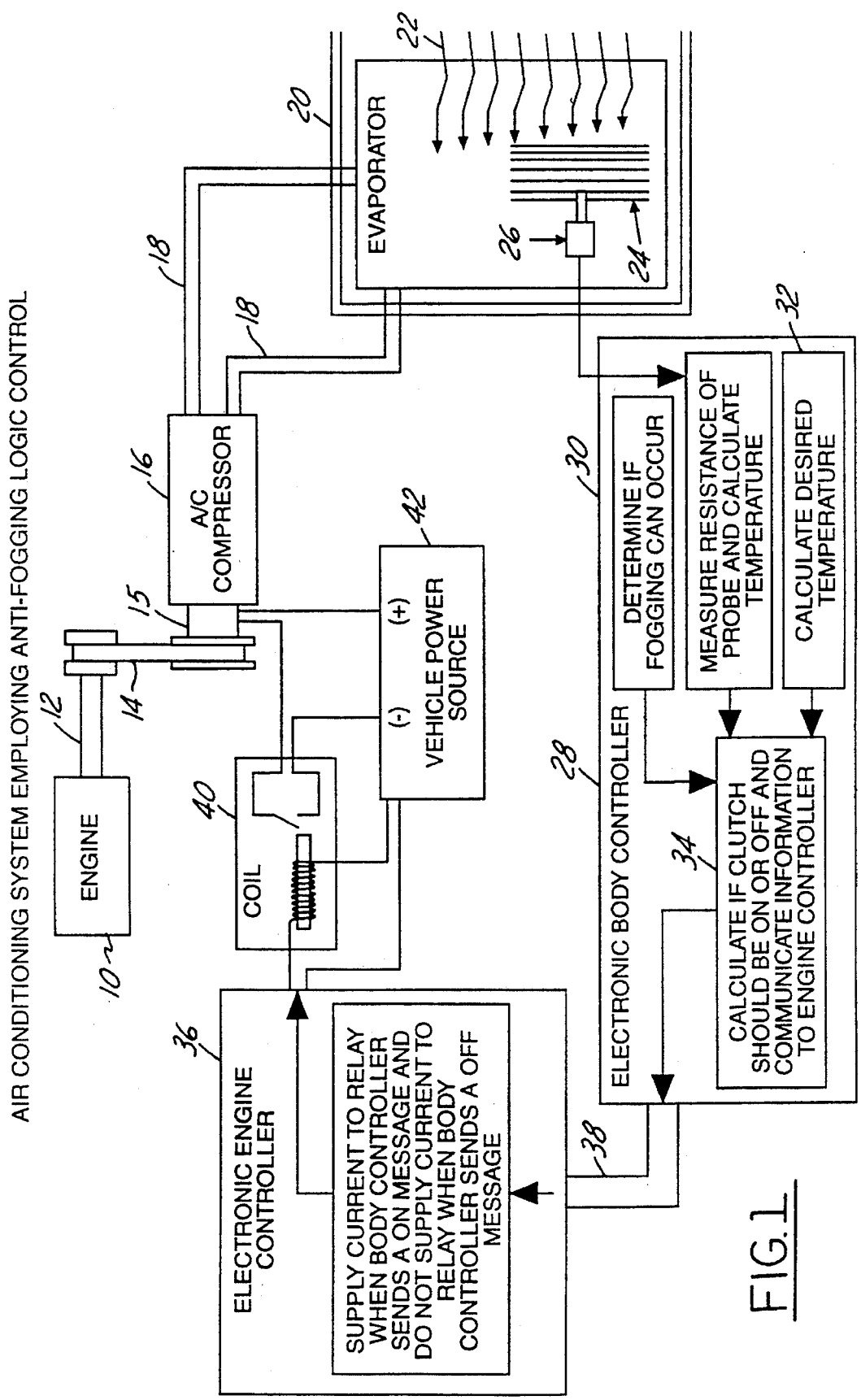
FIG. 1 is a diagramatic drawing showing the air conditioning system of the present invention employing anti-fogging logic control.

Now referring to FIG. 1, the air conditioning system of the present invention includes a prime mover 10 (such as an internal combustion engine) coupled to air conditioning compressor 16 by way of shaft 12, belt 14, and clutch 15. A/C compressor 16 is adapted to circulate refrigerant through evaporator 20 by way of fluid circuit 18. Air 22 is passed across evaporator surface 24 wherein the heat is removed from the air and transferred to the refrigerant. The refrigerant flows from the evaporator to the condenser (condenser not shown) where the heat contained therein is transferred to the ambient air.

Temperature sensing probe 26 is coupled to evaporator surface 24 wherein it converts the temperature of the evaporator surface to an electronic signal and transfers the signal to electronic body controller 28. Electronic body controller 28 determines if conditions are present for fogging to occur 30. A desired temperature 32 is calculated, and the strategy for calculating the desired temperature, is based on, in part, the possibility (or lack) of the occurrence of a fogging condition 30. Electronic body controller 28 uses the strategy employed in 30, 32, to determine if clutch 15 should be engaged or disengaged. This determination is encoded an electric signal and passed along to electronic engine controller 36 by way of communication buss 38. Electronic engine controller 36 supplies current to air conditioning relay 40 which, in conjunction with vehicle power source 42 engages or disengages clutch 15. The operation of the anti-fogging strategy employed within electronic body controller 28 will now be discussed. In discussing the strategy, the following variable names will be used.

TABLE A

| Variable Name | Definition |
| --- | --- |
| EVAP_TEMP | The current evaporator temperature |
| DESIRED_STEADY_ST | The desired steady state temperature of the evaporator |
| DESIRED_FLOAT_ST | The desired floating temperature of the evaporator |
| INIT_TEMP_CYC_PT | Initial temperature cycle point constant |

Figure 2A:
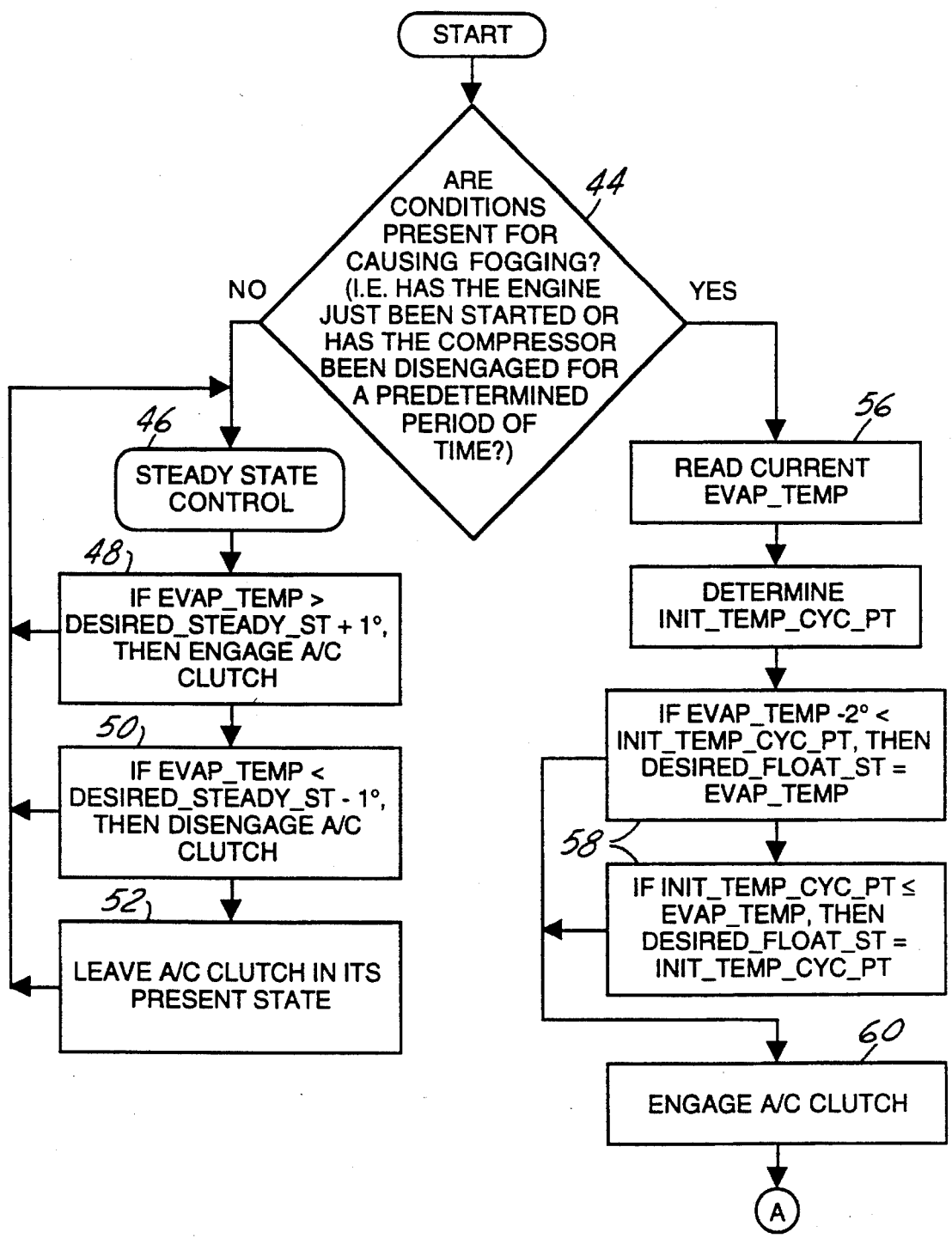
FIGS. 2A and 2B comprise is a logic flow diagram of the anti-fogging control strategy of the present invention.
Figure 2B:
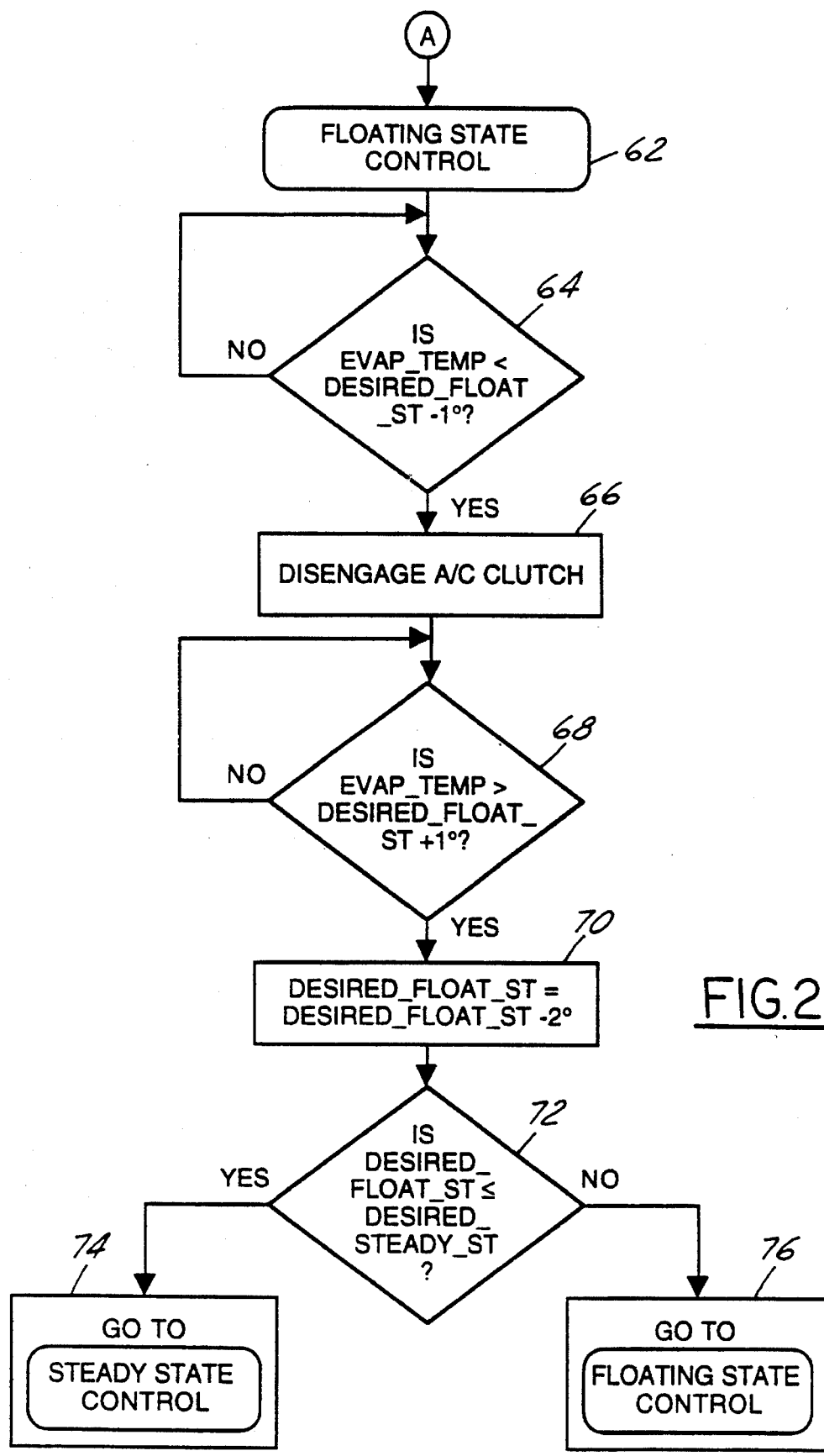
Figure 3:
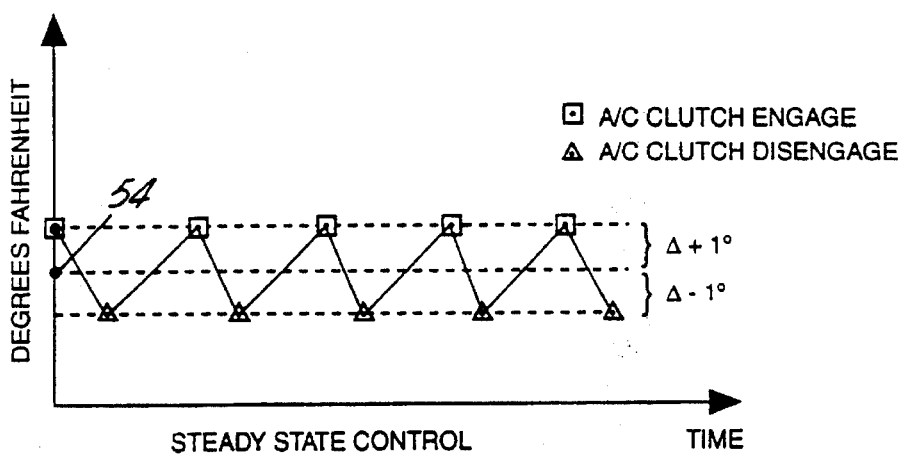
FIG. 3 is a graphical representation of the steady state phase anti-fogging control methodology of the present invention.

Now referring to FIGS. 1 and 2, the first determination made by the anti-fogging strategy of the present invention, is to determine if conditions are present for causing fogging 44. If there are no conditions present for causing fogging, electronic body controller 28 enters into its steady state control scheme 46. The steady state control scheme 46 includes monitoring the temperature of evaporator 20, engaging A/C clutch 15 when the evaporator temperature exceeds the desired steady state temperature by more than 1° F. 48, and disengaging A/C clutch 15 when the evaporator temperature is less than 1° F. below the desired steady state temperature 50. If the evaporator temperature is not above or below the desire steady state temperature by more than 1° F., clutch 15 is left in its present state 52. Steady state control strategy 46 is graphically represented in FIG. 3 wherein the desired steady state temperature 54 is set at a predetermined temperature level.

In determining whether fogging conditions exist 44, two conditions are checked. Firstly, if the engine (or prime mover) has just been started, conditions can be present which cause fogging. Secondly, if clutch 15 has been disengaged for a period of time which exceeds a predetermined fixed period, then conditions can occur which cause fogging. If either of the above two conditions are present, conditions are present for causing fogging and the logic flow proceeds to step 56.

The current evaporator temperature is read and the initial temperature cycle point constant is retrieved. The initial temperature cycle point constant is a fixed temperature value that represents the coldest temperature to which the evaporator can be lowered without cycling the compression clutch and without causing fogging. It is contemplated that the initial temperature cycle point value is determined by subjecting the vehicle to a high humidity condition and then lowering (in one step) the temperature of the evaporator from the ambient temperature to a predetermined temperature. If no fogging occurs, a lower temperature is selected and the test is run again. At some point in conducting such a test, fogging will occur and the evaporator temperature which causes fogging defines the limit for the initial temperature cycle point temperature constant. Preferably, such a test is conducted for each A/C system design contemplated because the design of an A/C system has some influence on the value of the initial temperature cycle point constant.

A fixed offset (such as 2° F.) is subtracted from the evaporator temperature and this value is compared against the initial temperature cycle point constant. The desired floating state variable is set equal to the lesser of these two values 58. A/C clutch 15 is engaged 60 and the floating state control strategy 62 commences.

With the A/C clutch engaged coolant flows through evaporator 20 and begins to lower its temperature. As soon as the evaporator temperature is one degree less than the desired floating state temperature 64 a command is issued 66 to disengage A/C clutch 15. Upon disengagement of A/C clutch 15 the evaporator temperature will begin to rise as circulating air 22 is passed over evaporator surface 24. As soon as the evaporator temperature is warmed to a temperature which is one degree greater than the desired floating state temperature 68, the desired floating state temperature is decremented by predetermined amount 70 (such as 2° F.) and a check is made to determine if the desired floating state temperature is equal to or less than the desired steady state temperature 72. If this occurs, the temperature of the evaporator has been decremented a sufficient number of times so that it now has reached the desired steady state temperature and the steady state control strategy 46 can now be used 74. If the desired floating state temperature is still greater than the desired steady state temperature than the floating state control strategy 62 is executed once again 76.

Figure 4:
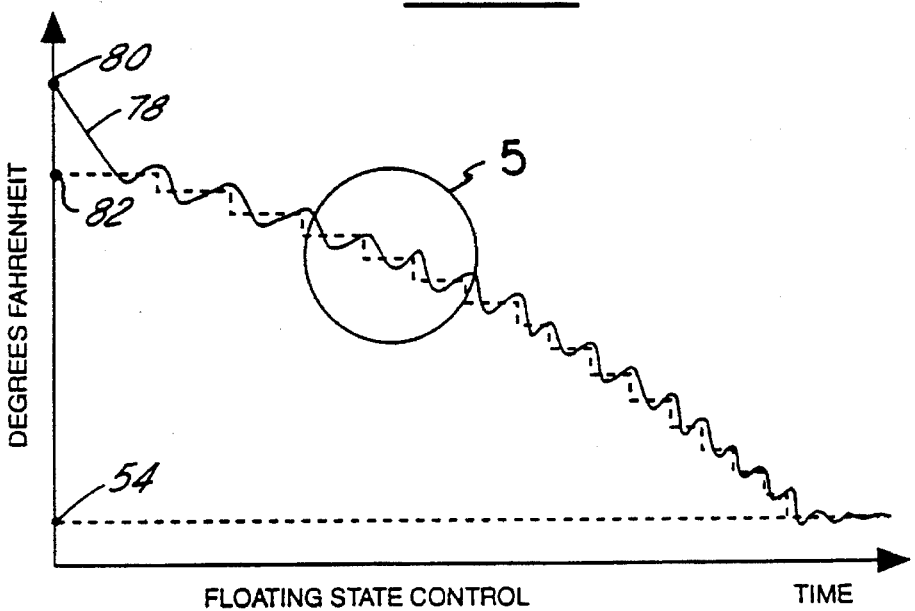
FIG. 4 is a graphical representation of the floating state control phase of the anti-fogging control methodology of the present invention.
Figure 5:
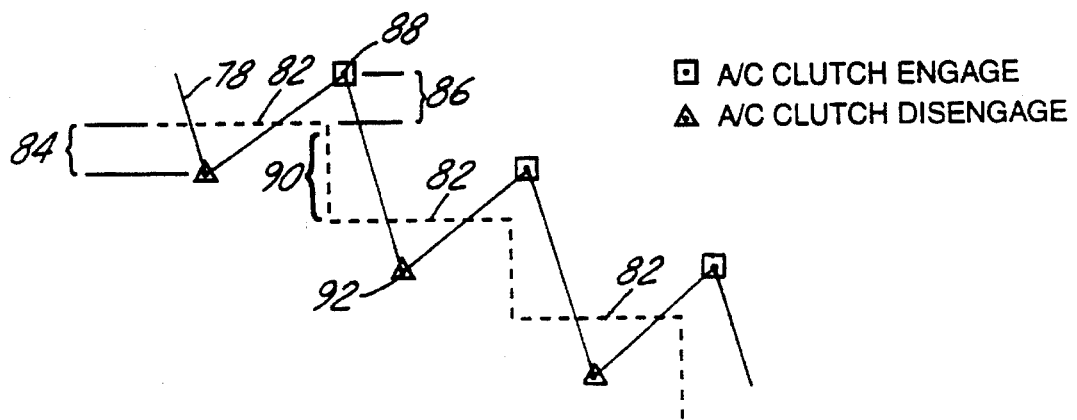
FIG. 5 is an amplified view of the encircled portion of the graph of FIG. 4.

The floating state control 62 of the present invention is graphically illustrated in FIGS. 4 and 5. FIG. 4 shows evaporator temperature 78 having an initial value 80 and dropping therefrom as soon as refrigerant begins to flow through evaporator 20. Desired floating state temperature 82 is selected as the lesser of the initial temperature cycle point constant or two degrees less than the evaporator temperature. In most cases, the initial temperature cycle point constant will be much less than two degrees lower than the evaporator temperature and accordingly, the initial temperature cycle point constant will be the desired floating state temperature value. The use of an initial temperature cycle point value is critical to the quick initial responsiveness of the anti-fogging system of the present invention. Because the initial temperature cycle point value will, under normal conditions, be much less than two degrees less than the evaporator temperature, it allows the evaporator to initially cool at a much quicker rate than it could otherwise do if the strategy simply initiated cooling by decrementing the evaporator temperature two degrees at a time. Of course, the initial temperature cycle point constant must be carefully chosen (as disclosed in the scheme previously discussed) so that evaporator 20 does not initially cool too quickly. If evaporator 20 is allowed to cool too quickly, fogging occurs and thus the purpose of the anti-fogging strategy is defeated. FIG. 4 generally depicts a control led decline of evaporator temperature 78 until the temperature of evaporator 78 is coincident with the desired steady state temperature 54.

Now referring to FIG. 5, an enlarged view of a portion of

FIG. 4 shows that clutch 15 is engaged until evaporator temperature 78 drops below desired floating state temperature 82 by approximately 1° F. 84. When this occurs, clutch 15 is disengaged and the evaporator temperature 78 begins to rise by virtue of warm air 22 passing over evaporator 20. The temperature 78 is allowed to rise until it exceeds desired floating state temperature by approximately one degree 86. Next, A/C clutch 15 is engaged 88 and desired floating state temperature 82 is decremented by predetermined amount 90 (preferably 2° F.). Evaporator temperature 78 begins to fall until it drops one degree below the newly adjusted desired floating state temperature 92. This cycle continues until desired floating state temperature 82 is coincident with desired steady state temperature 54 as has already been explained in conjunction with FIG. 4.

By allowing evaporator temperature 78 to drop one degree below desired floating state temperature 82 and then allowing it to rise one degree above desired floating state temperature 82, local cold spots in the surface 24 of evaporator 20 dissipate. Thus, this cycling strategy forms an effective means for ensuring that the temperature of evaporator surface 24 is uniform. Thus, fogging is minimized or eliminated.

The foregoing detailed description shows that the preferred embodiments of the present invention are well suited for fulfill the objects of the invention. It is recognized that those skilled in the art may make various modifications or additions to the preferred embodiments chosen here to illustrate the present invention without departing from the spirit of the present invention. For example, fixed temperature decrements and increments of 1° F. and 2° F. have been discussed in conjunction with the anti-fogging strategy of the present invention. However, it is contemplated that other fixed temperature differentials of various magnitudes may be used without deviating from the teaching of the disclosed strategy. Accordingly, it is to be understood that the subject matter sought to be afforded protection thereby should be deemed to extend to the subject matter defined in the appended claims, including all fair equivalents thereof.

We claim:

1. A method of controlling fogging in an air conditioning system of the type employing an evaporator and a pump driven by a prime mover, said pump circulating refrigerant through the evaporator, including the steps of:

A) determining if conditions for fogging exist,

B) in response to an affirmative determination in step A. lowering the temperature of the evaporator at a controlled rate.

2. The method of claim 1, wherein step A includes the substep of:

i) determining if said pump has been disengaged from said prime mover for a predetermined period of time.

3. The method of claim 1, wherein step A includes the substep of:

i) determining if said pump has recently circulated refrigerant through said evaporator.

4. The method of claim 1, wherein step B includes the substeps of:

i) firstly, lowering the temperature of said evaporator by a first incremental amount, then ii) secondly, lowering the temperature of said evaporator by a second incremental amount, wherein said first incremental amount is greater than said second incremental amount.

5. The method of claim 1, wherein step B includes the substeps of:

i) firstly, lowering the temperature of said evaporator from a first temperature to a second temperature, ii) then, allowing said temperature of said evaporator to rise to a third temperature, said third temperature bounded between said first temperature and said second temperature, iii) then, lowering the temperature of said evaporator from said third temperature to a fourth temperature, wherein said fourth temperature is lower than said second temperature.

6. Anti-fogging air conditioning system, comprising:

an air conditioning compressor, an evaporator coupled to said compressor, means for sensing the temperature of said evaporator, means coupled between said sensing means and said compressor for determining if fogging conditions exist and if fogging conditions exist, means for lowering said temperature of said evaporator at a controlled rate.

7. The method of claim 6, further including:

means for lowering the temperature of said evaporator by a first incremental amount, and means for lowering the temperature of said evaporator by a second incremental amount, wherein said first incremental amount is greater than said second incremental amount.

8. The method of claim 6, further including:

means for lowering the temperature of said evaporator from a first temperature to a second temperature, means for allowing said temperature of said evaporator to rise to a third temperature, said third temperature bounded between said first temperature and said second temperature, and means for lowering the temperature of said evaporator from said third temperature to a fourth temperature, wherein said fourth temperature is lower than said second temperature.

* * * * *